United States Patent [19]

Caray et al.

[11] Patent Number: 4,588,062

[45] Date of Patent: May 13, 1986

[54] TORSION DAMPING ASSEMBLY FOR AUTOMOTIVE FRICTION CLUTCH PLATE

[75] Inventors: Andreé Caray, Valence; Pierre Loizeau, Ville D'Avray, both of France

[73] Assignee: Valeo, Paris, France

[21] Appl. No.: 513,078

[22] Filed: Jul. 12, 1983

[30] Foreign Application Priority Data

Jul. 12, 1982 [FR] France .................. 82 12219

[51] Int. Cl.⁴ ............................................ F16D 47/02
[52] U.S. Cl. .............................. 192/106.2; 192/70.17; 464/68
[58] Field of Search ............... 192/106.1, 106.2, 70.17; 464/68

[56] References Cited

U.S. PATENT DOCUMENTS 3,362,512  1/1968  Ericson ................................. 192/68
4,480,736  11/1984  Loizeau ............................ 192/106.1

FOREIGN PATENT DOCUMENTS 1389604  1/1965  France .
2493447  5/1982  France .

*Primary Examiner*—Ronald C. Capossela
*Attorney, Agent, or Firm*—Charles E. Brown; Brown, Charles A.

[57] ABSTRACT

A torsion damping assembly for a friction clutch plate comprises two coaxial parts mounted for relative rotation within a predetermined range of angular displacement. Circumferentially acting springs including a resiliently deformable arm are circumferentially disposed between the coaxial parts. The resiliently deformable arm circumferentially extends from a support member fixed for rotation with one coaxial part and the free end of the arm is attached to the other coaxial part. A pair of axially spaced transverse surfaces are provided on each coaxial part. The support member is disposed axially between the respective pairs of transverse surfaces for maintaining the axial position of the coaxial parts relative to each other.

12 Claims, 8 Drawing Figures

TORSION DAMPING ASSEMBLY FOR AUTOMOTIVE FRICTION CLUTCH PLATE

BACKGROUND OF THE INVENTION

The present invention relates generally to torsion damping assemblies which comprise two coaxial parts mounted for relative rotation within a predetermined range of angular displacement and circumferentially acting resilient means circumferentially disposed between the coaxial parts.

As is known such a torsion damping assembly is usually part of an automotive clutch plate. One of the coaxial parts then comprises friction disc adapted to be fixed for rotation with a first shaft which in practice is the driving shaft, and the output shaft of the engine in the case of a motor vehicle, and the other coaxial part comprises a hub adapted to be fixed for rotation with a second shaft which in practice is the driven shaft and the transmission input shaft in the case of such a motor vehicle.

Such a torsion damping assembly ensures a regular or uniform torque transmission to one of the coaxial part when the other coaxial part is subjected to rotational torque, i.e., in case of a motor vehicle, to filter vibrations which are capable of developing along the kinematic chain running from the engine to the driven wheels of the vehicle.

Most often the resilient means circumferentially interposed between the coaxial parts of such a torsion damping assembly comprise coil springs which are each arranged chordally of a circumference of the assembly and, partly in an opening or window formed in an annular component which belongs to one of the coaxial parts and partly in an opening or window formed in another component, e.g., an annular member, which is parallel to the annular component, and part of the other of the coaxial parts.

It has, however, been proposed, notably in French patent publication No. 2,493,447 in the name of the assignee of the present application, to employ as at least a part of the resilient means at least one resiliently deformable arm which extends circumferentially from a support member fixed for rotation with one of the coaxial parts and attached at its end to the other coaxial part.

In practice such a resiliently deformable arm and its support may advantageously be formed by suitably cutting out a single blank of sheet metal so that the construction is particularly economical and the axial arrangement spares the coaxial parts and/or provides additional place in the coaxial parts for the other resilient means.

BRIEF SUMMARY OF THE INVENTION

A general object of the invention is the provision of an arrangement which take further advantage of the resilient means formed by the resiliently deformable arm and the support member therefor.

According to the invention there is provided a torsion damping assembly of the foregoing type, notably for a motor vehicle, comprising two coaxial parts mounted for relative rotation within a predetermined range of angular displacement, circumferentially acting resilient means circumferentially interposed between the coaxial parts. The circumferentially acting resilient means comprises at least one resiliently deformable arm extending circumferentially from an arm support member fixed for rotation with one of the coaxial parts and having a free end attached to the other of the coaxial parts. The torsion damping assembly is characterised by the arm support member being disposed axially between two transverse surfaces which are part of one of said coaxial parts and two transverse surfaces which are part of the other coaxial part, the arm support member maintaining the axial position of the coaxial parts relative to each other.

Otherwise put, the arm support member in addition to rotational securement to one of the coaxial parts maintains the axial position of the coaxial parts relative to each other.

In the preferred arrangement wherein a first of the coaxial parts comprises an externally splined inner hub and the second coaxial part comprises an internally splined outer hub, the externally splined inner hub meshing with clearance with the internally splined outer hub, one of the transverse surfaces which is part of the first coaxial part being formed on the externally splined portion of the inner hub and the other transverse surface of the first coaxial part being part of a resilient ring or spring washer received in a groove in the inner hub. Once the resilient ring is installed the axial assembly of the torsion damping assembly is ensured.

In the preferred arrangement wherein the outer hub of the second coaxial part has a radial hub flange or web, the second coaxial part also comprises two annular guide members or drive washers disposed on respective sides of and spaced from the hub flange, the resiliently deformable arm and the arm support member are preferably disposed in a space defined between the annular guide members, one of the transverse surfaces of the second coaxial part being part of the outer hub and the other transverse surface of the second coaxial part being part of one of the annular guide members.

According to a further feature of the invention said one of the annular guide members extends sufficiently radially toward the axis of the torsion damping assembly to cover or overlie not only the resiliently deformable arm but also partially over the arm support member. This provides advantageous protection of the resiliently deformable arm during handling before assembling the torsion damping assembly in a friction clutch, sparing the resiliently deformable arm from any impacts or shocks which would damage and/or deform it and would otherwise jeopardize satisfactory operation in service.

In any event, the free end of the resiliently deformable arm may be attached to the other coaxial part by a single axial pin and freely rotatable about the pin. Rotation of the free end of the resiliently deformable arm about the pin absorbs without undue friction or risk of binding owing to inevitable variations in diameter during relative rotation of the coaxial parts.

Alternatively, the resiliently deformable arm may be attached at its free end to the other coaxial part by two parallel spaced apart axial pins, positively anchoring the free end of the resiliently deformable arm to the other coaxial part without any possible rotational movement.

BRIEF DESCRIPTION OF THE DRAWINGS

These and other features and advantages of the invention will become apparent from the description which follows, given by way of example, with reference to the accompanying diagrammatic drawings.

DESCRIPTION OF THE PREFERRED EMBODIMENTS

The drawings illustrate the invention by way of example as applied to a friction clutch for a motor vehicle.

In the illustrated embodiments the friction clutch plate comprises two coaxial parts A, B rotatably mounted relative to each other within a predetermined range of angular displacement against circumferentially acting resilient means circumferentially interposed therebetween.

Figure 1:
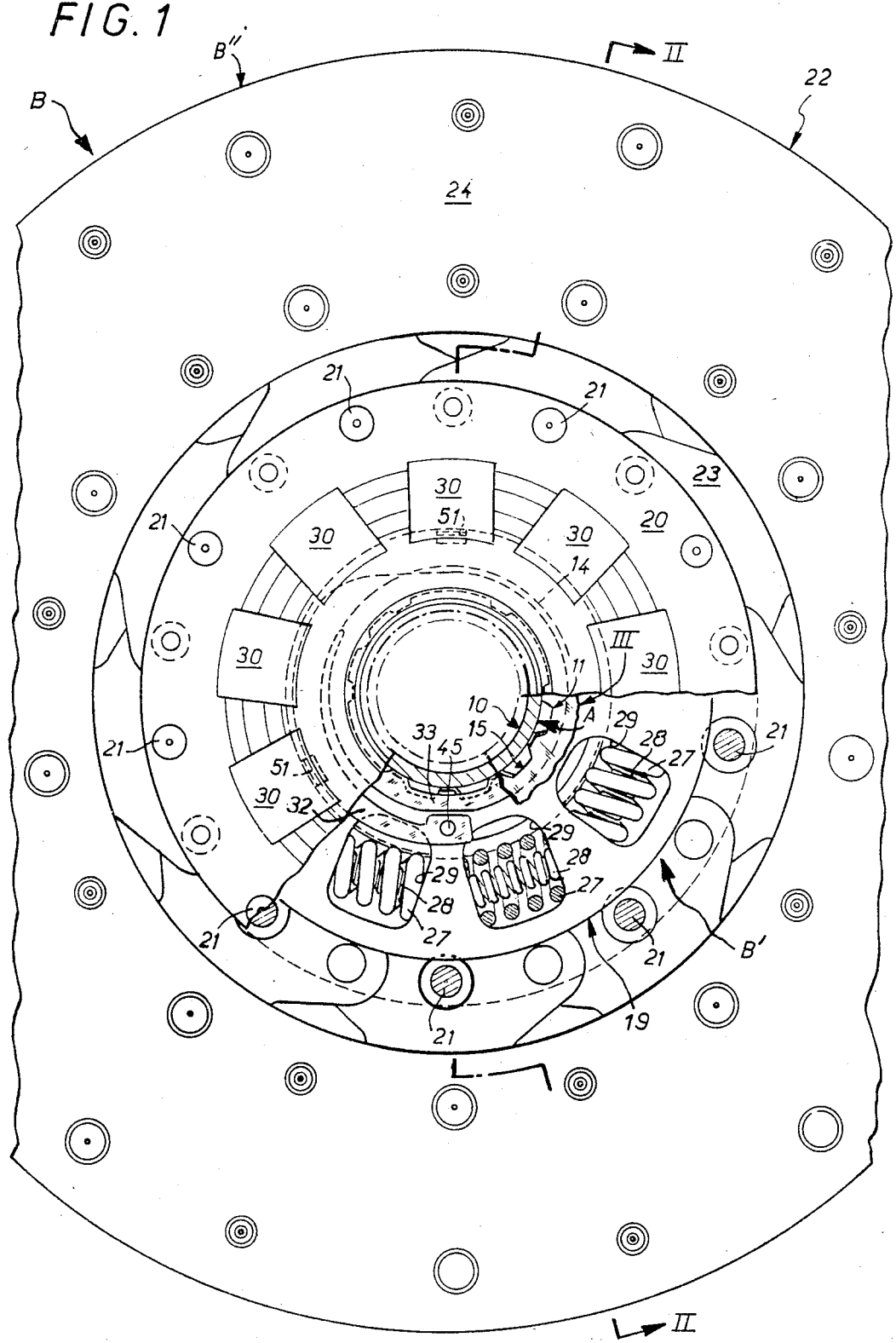
FIG. 1 is an elevational and sectional view, with parts cut away, of a torsion damping assembly, taken along broken line I—I in FIG. 2.
Figure 2:
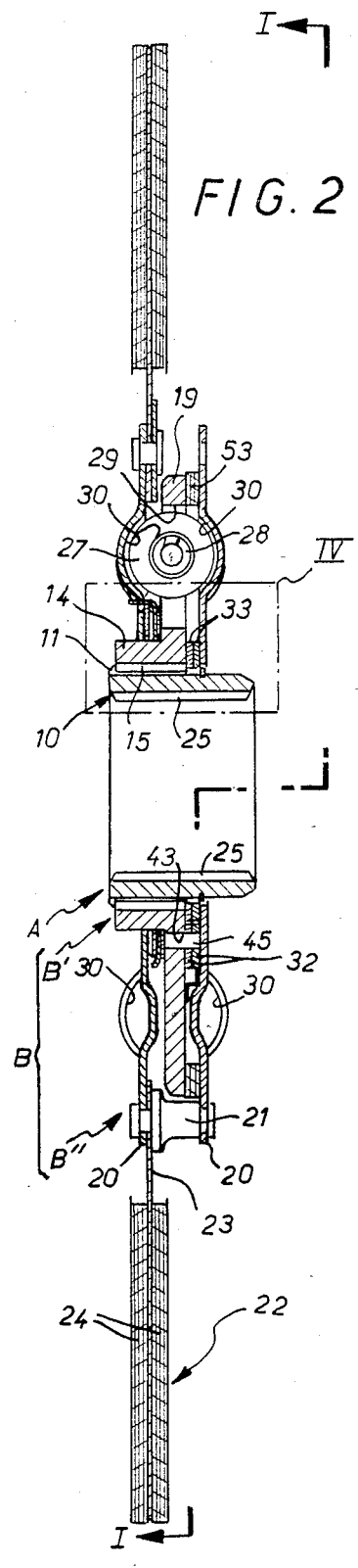
FIG. 2 is a longitudinal sectional view taken along broken line II—II in FIG. 1.
Figure 3:
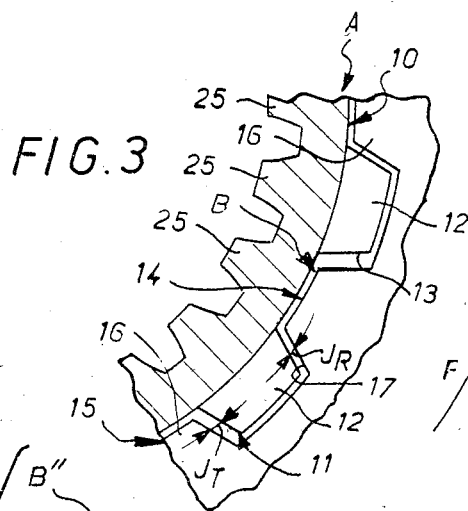
FIG. 3 is an enlarged view of the area identified by arrow III in FIG. 1.

Coaxial part A comprises an inner hub having externally splined portion 11 having axial splines 12 extending along part of its length alternating with axial grooves 13, FIGS. 1-3. Coaxial part B itself comprises, in the illustrated embodiments, two coaxial members B', B" rotatably mounted relative to each other within a predetermined range of angular displacement against circumferentially acting resilient means.

Coaxial member B' and therefore coaxial part B comprise an outer hub 14 which is received on the inner hub 10 and has an internally splined portion 15 extending along its entire length, in the illustrated embodiment, inner splines 16 alternating with axial grooves 17 mesh with clearance with the outer grooves 13 and splines 12 of the inner hub 10.

In the illustrated embodiment the outer hub 14 of the coaxial part B has an annular radial web or flange 19 hereinafter referred to as the hub flange.

Coaxial member B" and therefore coaxial part B comprise, in the illustrated embodiment, two annular guide members or drive washers 20 disposed on the respective sides of and spaced from the hub flange 19 and axially fixed to each other for rotation.

In the illustrated embodiment the annular guide members are fixed to each other by cross members or connecting member 21 circumferentially spaced from one another. Further, in this embodiment, the connecting members 21 are defined by pins or rivets which extend beyond the outer periphery of the hub flange 19. This is not necessarily the case, however.

In any event, the present torsion damping assembly being part of an automotive clutch plate, the coaxial part B comprises, in practice, an input member and for this reason carries a radially extending friction disc 22 the actual supporting web 23 of which is divided into separate blades as shown. The friction disc 22 is mounted on one of the annular guide members 20 defining coaxial member B" by connecting members 21 which already fix the annular guide members 20 together.

Through the friction facings 24 on each face of the web 23 the friction disc 22 is adapted to be fixed for rotation with a first shaft, in practice a driving shaft, which is the engine output shaft in the case of a motor vehicle, by axially pressing or squeezing the friction disc between a pressure plate and a reaction plate or flywheel (not shown) fixed for rotation with such a shaft.

Conversely, the coaxial part A is the output part in this case. The inner bore of the inner hub 10 of coaxial part A which is provided with splines 25 is adapted to be fixed for rotation with a second shaft which in practice is the driven shaft such as the transmission input shaft of a motor vehicle.

In the illustrated embodiment the circumferentially acting resilient means circumferentially disposed between the coaxial members B', B" which define the coaxial part B comprises a first plurality of springs 27, nine in practice, and a second plurality of springs 28, also nine in practice, which are individually received in the respective springs 27 of the first plurality. Each of springs 27, as well as springs 28 extends substantially chordally along the same circumference of the assembly and is arranged, under preload, partly in an opening or window 29 formed in the hub flange 19 and partly in housings 30 formed by axially alternating stamped regions in the annular guide members 20.

In the illustrated embodiment, and for the sake of simplification, the circumferential extent of the openings or windows 29 in the hub web 19 is equal to that of the housings 30 in the annular guide members 20 as regards all of the springs 27, 28. But this is not necessarily so. On the contrary, the circumferential length of openings or windows 29 in the hub flange 19 may for at least some of the springs 28, 29 be greater than that of the housings 30 in the annular guide members 20 to provide delayed action of the springs during angular displacement between coaxial members B', B" of the coaxial part B in a manner which is known per se and will not be described in greater detail herein.

In conjunction therewith the circumferentially acting resilient means circumferentially interposed between the coaxial parts A and B comprises at least one resiliently deformable arm 32 which extends circumferentially from an arm support member 33 fixed for rotation with one of coaxial parts A, B and which has a free end which is attached to the other of the coaxial parts B, A.

In the illustrated embodiment, and for the sake of ease of construction, two resiliently deformable arms 32 are employed which together with their respective arm support members 33 are axially superposed, in registration, on one another.

In practice, each arm support member 33 comprises a washer which is formed in one-piece with the corresponding resiliently deformable arm 32, the resulting component is cut out of a single flat metal blank. The effect of the pair of resiliently deformable arms 32 and their arm support members 33 in register is the same as a single such component cut out of a blank twice as thick.

For the sake of simplification of the description which follows reference will be made to a single resiliently deformable arm 32 and a single arm support member 33.

It goes without saying that the features of the resiliently deformable arm and support member described below are the same in each such component.

According to the invention the arm support member 33, is axially interposed between two transverse surfaces or shoulders 35, 36 on one of the coaxial parts A, B and between two transverse bearing surfaces or shoulders 60, 61 on the other coaxial part B, A.

In the illustrated embodiment the transverse surfaces 35, 36 are part of first coaxial part A and transverse bearing surfaces 60, 61 are part of second coaxial part B. In practice, as illustrated, the transverse surface 35 is part of the externally splined portion 11 of the inner hub 10 defining coaxial part A and transverse surface 36 is part of a spring washer 37, e.g. a split spring washer, received in a groove 40 in the inner hub 10 and bearing against one of the sides thereof.

Also, in practice, and as illustrated, the externally splined portion 11 of the inner hub 10 is radially truncated or tapered along part of its length from the transverse surface 35 thereon. The arm support member 33 has a toothed portion comprising teeth 39 along its inner periphery meshing with the tapered or truncated part of the externally splined portion 11 of the inner hub 10 for rotational securement therewith.

Figure 5:
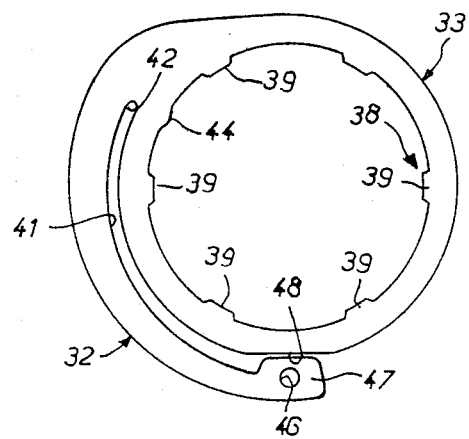
FIG. 5 is an elevational view of a resiliently deformable arm together with its support member for the torsion damping assembly according to the invention.

As best seen in FIG. 5, the teeth 39 on the arm support member 33 have a pitch greater than that of the grooves 13 of the external splining 11 of the inner hub and may be double the pitch of the latter.

Further, as illustrated, the spring washer 37 not only bears axially against the toothed portion 38 of the arm support member 33 but also partially against the main part of the arm support member 33. This is not necessarily so since the spring washer 37 may bear only against the toothed portion 38 of the arm support member 33.

There is an arcuate slot 41 radially separating the resiliently deformable arm 32 from the arm supoort member 33. The arm support member 33 has a radial reinforcing protrusion 44 along its inner periphery opposite the closed end 42 of the slot 41. The radial protrusion 44 which is midway between two consecutive teeth 39 of the arm support member 33 is advantageously located in line with the corresponding groove 13 in the externally splined portion 11 of the inner hub 10.

The free end of the resiliently deformable arm 32 is attached to the second coaxial part B by a single pin 45 in the FIGS. 1-5 embodiment. The pin 45 is force-fitted in an axial bore 43 in the hub flange 19 of the second coaxial part B. The resiliently deformable arm 32 is adapted to rotate about the pin 45. The resiliently deformable arm 32 includes a radially inwardly enlarged portion 47 at its free end having an aperture 46 in which the pin 45 is received (FIG. 5). The enlarged end portion 47 of the resiliently deformable arm 32 faces a flat 48 on the outer periphery of the arm support member 33 which flat is located angularly between two consecutive teeth 39 on the arm support member 33. Such an arrangement contributes to the preloading of the resiliently deformable arm 32.

Located between two transverse surfaces 35, 36 on the first coaxial part A axially facing each other, the arm support member 33 advantageously axially maintains the coaxial parts A, B relative to each other by also being located axially between two transverse bearing surfaces 60, 61 on the second coaxial part B, as already mentioned.

For this purpose, as illustrated, the resiliently deformable arm 32 and the arm support member 33 are disposed in a space defined between annular guide members 20 of the coaxial member B″ of the second coaxial part B, and more specifically in the space defined between the hub flange 19 and one of the annular guide members 20.

Accordingly, the arm support member 33 is indeed interposed axially between two transverse surfaces 60, 61 which are part of the second coaxial part B and axially face each other. The transverse surface 60 is formed on the outer hub 14 which is part of coaxial member B′ of coaxial part B and transverse surface 61 is formed on the associated annular guide member 20 which is part of the coaxial member B″ of coaxial part B.

In the FIGS. 1-5 embodiment the annular guide member 20 comes into the immediate vicinity of the associated spring washer 37.

The resilient deformable arm 32 and the arm support member 33 are therefore nearly totally protected.

In any event, and as will be noted, in the FIGS. 1-5 embodiment, the transverse surfaces 60, 61 of the second coaxial part B are, for the most part, disposed radially outwardly of the transverse surfaces 35, 36 of the first coaxial part A.

Further, as is known per se, such a clutch plate having a torsion damping assembly for an automotive friction clutch may further comprise friction means disposed axially between the coaxial parts. As illustrated, the friction means comprises a friction ring or washer 49 on the side of the hub flange 19 axially remote from the resiliently deformable arm 32 and in contact with the hub flange 19. Friction ring or washer 49 is supported by backing washer 50 keyed by axial tabs 51 to the corresponding annular guide member 20. The friction ring or washer 49 is subjected to an axially acting spring washer 52, such as an undulated or crinkle washer sold under the trademark Onduflex, which is interposed axially between the annular guide member 20 and the backing washer 50.

Figure 4:
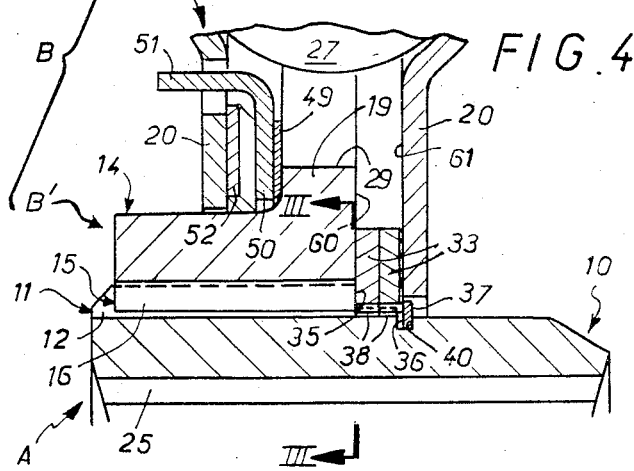
FIG. 4 is an enlarged view of the part included in box IV in FIG. 2.

Also, a friction ring or washer 53 is provided on the side of the hub flange 19 facing the resiliently deformable arm 32 and located at the outer periphery of the hub flange 19 between the latter and the annular guide member 20 to the same side of the hub flange 19. An axially acting spring washer 52 axially presses the friction ring or washer 53 between the hub flange 19 and the annular guide member 20 to the same side of the hub flange 19 as friction ring or washer 53. The thickness of friction washer 53 therefore determines the axial distance between the transverse surfaces 60 and 61 of the second coaxial part B axially between which the resiliently deformable arm 32 and the arm support member 33 are located. For this reason the thickness of the arm support member 33 must be at most equal to that of the friction washer 53. In practice, the thickness of the arm support member 33 is slightly less than that of the friction washer 53 and therefore there is slight axial play between the arm support member 33 and the transverse surfaces 60, 61 of the second coaxial part B. In FIG. 4 this axial play is represented, by way of example, between the arm support member 33 and the adjacent annular guide member 20.

On the other hand, as illustrated, there is no axial play between the arm support member 33 and the transverse surfaces 35, 36 of first coaxial part A between which it is located. Nevertheless, alternatively, such axial play may be provided between the arm support member 33 and transverse surfaces 35, 36 in order to provide the necessary assembly tolerances.

In any event coaxial members B' and B" which make up coaxial part B are axially in a single block which is adapted to move away from the arm support member 33 within the limits of the corresponding axial play between transverse surfaces 60, 61. Depending on the direction of displacement which in any event is very small the transverse surface 60 or 61 is in axial abutment against the arm support member 33. In either case the second coaxial part B is axially maintained relative to the first coaxial part A.

In the rest position of the torsion damping assembly, as shown in FIG. 3, the internal splines 16 of the outer hub 14 are received with clearance in both directions in the grooves 13 formed between external splines 12 of the inner hub 10. In other words, in the rest position, there is circumferential play between each spline 12 on the inner hub 10 and the circumferentially adjacent splines 16 on the outer hub 14. The circumferential clearance JT in the direction as represented by arrow F in FIG. 3 corresponds to "pull" operation (corresponding to flywheel driving wheels) of the torsion damping assembly and circumferential clearance JR corresponds to "push" operation (corresponding to wheels driving flywheel) of the assembly.

When, as the torsion damping assembly is rotative in the direction of arrow F in FIG. 3, torque is applied to coaxial member B" of coaxial part B, first of all only the resiliently deformable arm 32 yields, since the preloading of springs 27, 28 is considerably greater than the stiffness of the resiliently deformable arm. Coaxial parts B and A therefore rotate relative to each other.

Figure 6:
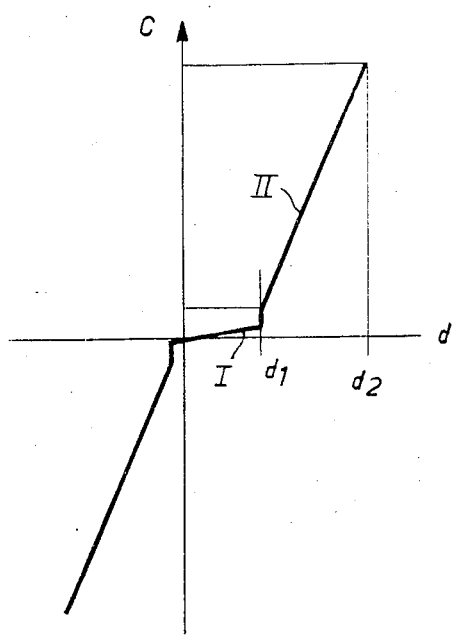
FIG. 6 is a graph illustrating the operation of the torsion damping assembly according to the invention.

In the graph of FIG. 6 the angular displacement d is marked along the abscissae and the torque c along the ordinate. The first stage of operation is represented by a straight line I having a slope proportional to the stiffness of the resiliently deformable arm 32. When the clearance JT between coaxial parts A and B is absorbed after an angular displacement $d_1$, the coaxial part B is then driven positively by coaxial part B and springs 27 and 28 come into action. Since springs 27 and 28 are preloaded there is an instantaneous increase in the torque c. Thereafter springs 27 and 28 yield elastically and coaxial members B' and B" of coaxial part B are displaced relative to each other.

The operation of the torsion damping assembly is then represented by a straight line having a slope proportional to the spring rate or stiffness of springs 27 and 28 together with that of the resiliently deformable resilient arm 32 which remains in its stressed condition at the end of the relative angular displacement between the coaxial parts A and B.

When, after an angular displacement $d_2$, at least one of the springs 27 and 28 is totally compressed, there is positive driving of coaxial member B' with respect to coaxial member B" and therefore through coaxial member B' a positive driving of the coaxial part A by coaxial part B" which is part of coaxial part B.

When the torque transmitted falls the opposite procedure ensues.

Obviously, for the sake of simplification, the effect of hysteresis due to the friction developed between the coaxial parts and members has not been taken into account, in other words, as is known per se, there is a difference between the value of torque for a given value of angular displacement depending on whether the torque increases or the torque decreases.

As will be noted, in the foregoing description, the resiliently deformable arm 32 has the same effect in both "pull" and "push" operation.

However, if desired, two resiliently deformable arms 23 of circumferentially opposite configurations relative to each other may be provided, one operative during "pull" operation and the other operative during "push" operation.

Figure 7:
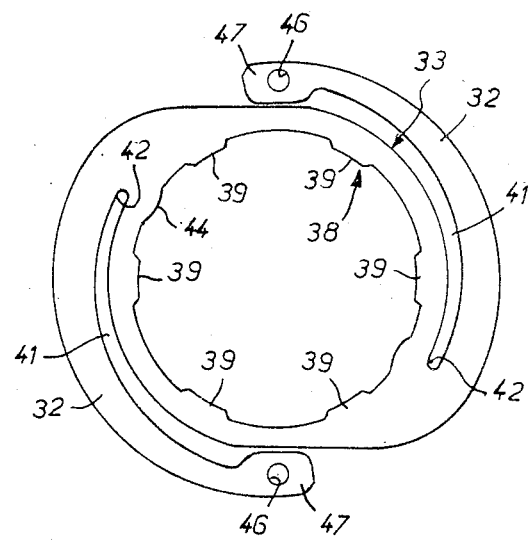
FIG. 7 is a view similar to that of FIG. 5 for another embodiment of the resiliently deformable arm together with its support member.

In the FIG. 7 embodiment there are two resiliently deformable arms 32 of the same circumferential configuration and mirror images of each other for one arm support member 33. A radial protrusion 44 is again provided opposite the closed end 42 of each of the slots 42 between the arms 32 and the arm support 33.

Figure 8:
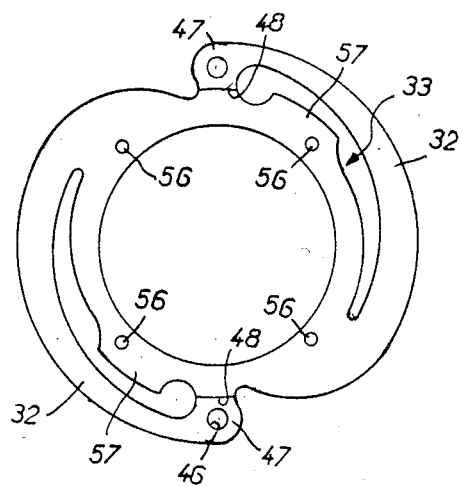
FIG. 8 is another view similar to that of FIG. 5 for yet another embodiment of the resiliently deformable arm together with its support member.

In the FIG. 8 embodiment there are also two resiliently deformable arms 32 for the same arm support member 33. In this embodiment, in the rest position of the torsion damping assembly an enlarged radial portion 47 at the free end of each of the deformable arms reaches a corresponding flat 48 on the arm support member 33, the enlarged portion at the free end of each deformable arm being provided with a complementary flat.

Further, the arm support member 33 is adapted to be fixed for rotation with the inner hub at a plurality of points and to this end is provided with spaced holes 56 for receiving fastening means such as a pin or screw (not shown in the drawings). In the FIG. 8 embodiment four such holes 56 are provided. Two of the holes are disposed in the root region of the respective resiliently deformable arms 32 and therefore take advantage of the relatively large area of the arm support member. A local radial reinforcing protrusion 57 is directed toward the corresponding resiliently deformable arm 32 for each of the other two holes 56. Other than the fact that the radial protrusions 57 reinforce the arm support member at the locations of the fastening points, the radial protrusions 57 advantageously permit axial support of the adjacent annular guide member 20 to bear against such an arm support member 33. On the other hand, in this embodiment the inner periphery has a smooth circular contour.

Finally, with such an embodiment it is unnecessary to have a radially truncated form of externally splined portion 11 for the inner hub 10. On the contrary, in this case, the transverse surface 35 defined by the externally splined portion 11 for axial contact with the arm support member 33 may, if desired, extends to the main part of the inner hub 10 thereby totally eliminating the radially truncated part of the externally splined portion 11 thereof.

The scope of the present torsion damping assembly is not intended to be limited to the illustrated and described embodiments, but encompasses all variations and alternatives and/or combinations of features understood to those skilled in the art.

In particular, each resiliently deformable arm may be attached at its free end to the corresponding coaxial part by two axial pins arranged parallel and spaced from each other instead of a single axial pin.

Moreover, the field of the invention is not limited to clutch plates for automotive friction clutches comprising three coaxial parts and members relatively angularly mounted for displacement in pairs but more generally includes all torsion damping assemblies comprising at least two coaxial parts rotatably mounted for relative angular displacement.

Furthermore, suitably overlapping play indentations being provided between the spring washer (37) and the adjacent annular guide member, the transverse surfaces of the first coaxial part and those of the second coaxial part may be arranged at the same radial position.

What we claim is:

1. A torsion damping assembly for an automotive clutch, said torsion damping assembly comprising at least two coaxial parts mounted for relative rotation within a predetermined range of angular displacement, circumferentially acting resilient means circumferentially interposed between said coaxial parts, said circumferentially acting resilient means comprising at least one resiliently deformable arm circumferentially extending from an arm support member fixed for rotation with one of said coaxial parts, said resiliently deformable arm having a free end attached to the other of said coaxial parts, a pair of axially spaced transverse surfaces being provided on each of said coaxial parts, and said arm support member being disposed axially between the respective pairs of transverse surface for maintaining the axial position of said coaxial parts relative to each other.

2. The torsion damping assembly according to claim 1, wherein axial pin attaches the free end of said resiliently deformable arm to said other coaxial part for rotation therearound.

3. The torsion damping assembly according to claim 1, wherein two axial pins attach said resiliently deformable arm to said other coaxial part, said pins being parallel to and spaced from each other.

4. A torsion damping assembly for an automotive clutch, said torsion damping assembly comprising at least two coaxial parts mounted for relative rotation within a predetermined range of angular displacement, circumferentially acting resilient means circumferentially interposed between said coaxial parts, said circumferentially acting resilient means comprising at least one resiliently deformable arm circumferentially extending from an arm support member fixed for rotation with one of said coaxial parts, said resiliently deformable arm having a free end attached to the other of said coaxial parts, a pair of axially spaced transverse surfaces being provided on each of said coaxial parts, and said arm support member being disposed axially between the respective pairs of transverse surface for maintaining the axial position of said coaxial parts relative to each other, a first of said coaxial parts comprising an inner hub having an externally splined portion and a second of said coaxial parts comprising an outer hub having an internally splined portion received on and meshing with clearance with said externally splined portion of said inner hub, one of said pair of transverse surfaces on said first coaxial part being formed on said externally splined portion of said inner hub and the other of transverse surfaces on said first coaxial part is formed on a spring washer received in a groove formed in said inner hub.

5. The torsion damping assembly according to claim 4, wherein said outer hub comprises a hub flange, said second coaxial part comprising two annular guide members disposed on opposite sides of and spaced from said hub flange, said resiliently deformable arm and said arm support member being disposed in a space between said annular guide members.

6. The torsion damping assembly according to claim 5, wherein one of said annular guide members extends sufficiently toward the axis of said torsion damping assembly to cover said resiliently deformable arm and at least partially cover said arm support member.

7. The torsion damping assembly according to claim 6, wherein one of said transverse surfaces on said second coaxial part is formed on said outer hub and the other of said transverse surface on said second coaxial part is formed on said one annular guide member.

8. The torsion damping assembly according to claim 7, a slot being formed between said resiliently deformable arm, wherein said arm support member has a radial reinforcing protrusion at the level of a closed end of said slot, said radial protrusion being in alignment with a groove in said externally splined portion of said inner hub.

9. The torsion damping assembly according to claim 4, wherein said externally splined portion of said inner hub is radially truncated along part of its length from said one transverse surface of said first coaxial part formed on said externally splined portion of said inner hub.

10. The torsion damping according to claim 9, wherein said arm support member is annular and has at its inner periphery teeth for meshing with said truncated part of said externally splined portion of said inner hub for fixing said arm support member for rotation with said inner hub.

11. The torsion damping assembly according to claim 4, wherein said arm support member is annular and fixed for rotation with said inner hub at a plurality of points of securement, said arm support member having local radially enlarged reinforcing portions along its outer periphery for accommodating at least some of said points of securement.

12. A torsion damping assembly for an automotive clutch, said torsion damping assembly comprising at least two coaxial parts mounted for relative rotation within a predetermined range of angular displacement, circumferentially acting resilient means circumferentially interposed between said coaxial parts, said circumferentially acting resilient means comprising at least one resiliently deformable arm circumferentially extending from an arm support member fixed for rotation with one of said coaxial parts, said resiliently deformable arm having a free end attached to the other of said coaxial parts, a pair of axially spaced transverse surfaces being provided on each of said coaxial parts, and said arm support member being disposed axially between the respective pairs of transverse surfaces for maintaining the axial position of said coaxial parts relative to each other, a first of said coaxial parts comprising an inner hub having an externally splined portion and a second of said coaxial parts comprising an outer hub having an internally splined portion received on and meshing with clearance with said externally splined portion of said inner hub, said externally splined portion of said inner hub being radially truncated along part of its length from said one transverse surface of said first coaxial part formed on said externally splined portion of said inner hub.

* * * * *